United States Patent [19]

Tomishima

[11] Patent Number: 6,032,276
[45] Date of Patent: Feb. 29, 2000

[54] APPARATUS AND METHOD FOR READING DATA FROM A DISK TYPE RECORDING MEDIA

[75] Inventor: Yuichiro Tomishima, Sendai, Japan

[73] Assignee: Samsung Electronics Co., Ltd

[21] Appl. No.: 08/947,604

[22] Filed: Oct. 9, 1997

[30] Foreign Application Priority Data

Dec. 12, 1996 [JP] Japan ................................ 8-331973

[51] Int. Cl.[7] .............................. G11C 29/00; G11B 5/09
[52] U.S. Cl. ............................................ 714/723; 369/50
[58] Field of Search .................................... 371/21.6, 5.1; 360/53; 369/50, 32, 58; 714/723; 318/560

[56] References Cited

U.S. PATENT DOCUMENTS

| | | |
|---|---|---|
| 5,115,238 | 5/1992 | Shimizu et al. ........................ 340/988 |
| 5,166,936 | 11/1992 | Ewert et al. ........................... 371/21.6 |
| 5,422,890 | 6/1995 | Klingsporn et al. .................... 371/21.6 |
| 5,528,574 | 6/1996 | Takeuchi et al. ......................... 369/50 |
| 5,602,812 | 2/1997 | Miura et al. .............................. 369/54 |
| 5,612,933 | 3/1997 | Iso et al. ................................... 369/32 |
| 5,712,836 | 1/1998 | Kamoto et al. ........................... 369/50 |
| 5,754,355 | 5/1998 | Nakamura et al. .................. 360/73.03 |
| 5,784,518 | 8/1998 | Ogura ....................................... 386/68 |
| 5,815,691 | 9/1998 | Chung .................................... 395/555 |
| 5,822,142 | 10/1998 | Hicken ..................................... 360/53 |

*Primary Examiner*—Albert De Cady
*Assistant Examiner*—Shelly A Chase
*Attorney, Agent, or Firm*—Dilworth & Barrese

[57] ABSTRACT

An apparatus and method for reading data from a disk-type recording medium. The present invention controls the number of revolutions at which the recording medium rotates at according to the results of a defect study to provide error correction and maximum reading speed of recorded data.

14 Claims, 2 Drawing Sheets

| DEFECTIVE DATA NUMBER | DEFECTIVE DATA POSITION | | | REVOLUTION SPEED OF SPINDLE MOTOR | |
|---|---|---|---|---|---|
| | M | S | F | ERROR | REPRODUCTION |
| 1 | 00 | 03 | 45 | 8TIMES | 4TIMES |
| 2 | 01 | 12 | 21 | 8TIMES | 4TIMES |
| 3 | 01 | 15 | 11 | 8TIMES | 4TIMES |
| 4 | 03 | 31 | 08 | 8TIMES | 4TIMES |
| 5 | 04 | 02 | 72 | 4TIMES | 2TIMES |
| 6 | 11 | 18 | 54 | 4TIMES | 2TIMES |
| 7 | 17 | 23 | 00 | 1TIME | - |
| 8 | 22 | 31 | 41 | 8TIMES | 4TIMES |
| 9 | 24 | 02 | 11 | 4TIMES | 2TIMES |
| 10 | 33 | 11 | 32 | 8TIMES | 2TIMES |

FIG. 2

APPARATUS AND METHOD FOR READING DATA FROM A DISK TYPE RECORDING MEDIA

BACKGROUND OF THE INVENTION

1. Field of the Invention

The present invention relates to memory devices and more particularly, to an apparatus and method for reading data from a disk type memory.

2. Description of the Related Art

Generally, an optical disk drive, which is one example of disk drives for disk type memories, rotates a recording medium called an "optical disk". The optical disk is rotated at given revolution speed (i.e., a given number of revolutions per minute) while an optical-pick-up reads from or writes to the optical disk. When there is defective (or unreadable) data on the disk due to dust or damage to the recording media, the data cannot be accurately read using the given revolution speed. In order to read the defective area, the revolution speed is reduced until the data can be read (i.e., to perform error correction). In a conventional optical disk drive, error correction is performed by retry operations. Thus, if defective data is encountered during the reading of data, the pick-up is moved to where the defective data exists, and the number of revolutions of the disk is reduced. The reading operation is restarted at this position to read the defective data, i.e., to perform error correction. If it is impossible to achieve error correction with the reduced revolution speed, the above operation is retried in a subsequent manner.

The conventional optical disk drive performs a retry operation to read defective data and, depending on the extent of defective data, the number of retry operations may be quite large. For this reason, the conventional optical disk drive has an disadvantage in that reading speed is decreased when defective data is detected due to the retry operations.

SUMMARY OF THE INVENTION

Therefore, an objective of the present invention is to provide an apparatus and a method for increasing the reading speed of an optical disk by eliminating the retry operations when defective data is encountered.

To accomplish the above objective, a defect study is performed for determining the positions of defective data on the recording media and the revolution speed that the recording media can be rotated at to provide error correction (i.e., reading of defective data). The defect study is performed during an initial reading of data or during idle non-reading operating time. Error correction is provided by controlling the reading speed of the defective data area (i.e., the revolution speed of the recording media) according to the results of the defect study.

The results of the defect study are stored in a memory area such that the revolution speed at which the recording medium rotates is automatically reduced according to the results of a defect study to provide error correction and thus enable the reading of the defective data without interrupting or increasing disk access time.

In an illustrative embodiment, the defect study operates as follows: a search is performed to locate each position where defective data exists; the locations are registered (i.e., stored in memory); and an error correction test is performed to determine the revolution speed that the recording medium can be rotated for each position having defective data so that error correction can be provided (i.e., so that the defective data can be read). As an example, the positions of defective data can be registered in a RAM (Random Access Memory) within the CPU (Central Processing Unit). The CPU controls the reading operation by assigning an identification number to each position having defective data and by creating a table which includes the identification number, the positions of defective data, and the revolution speed capable of error correction for each position having defective data.

The reading operation for a position having defective data is controlled according to the results of the defect study. Upon accessing a position having defective data and a corresponding identification number predetermined earlier (either during an earlier read or during earlier idle operating time), the revolution speed of the recording media is reduced to the revolution speed specified for that position in the table, thereby enabling the reading of the defective data. Furthermore, if the corresponding defective data may be read with the error correction, general reading operations can be performed according to the original given number of revolution. Accordingly, when the reading operation is controlled using the results of the defect study, the retry operations performed by conventional disk drives are no longer necessary. Thus, the reading operation time is accelerated or increased.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein:

FIG. 2 shows an example of a defect information table according to an illustrative embodiment of the invention.

DETAILED DESCRIPTION OF THE PREFERRED EMBODIMENT(S)

Figure 1:
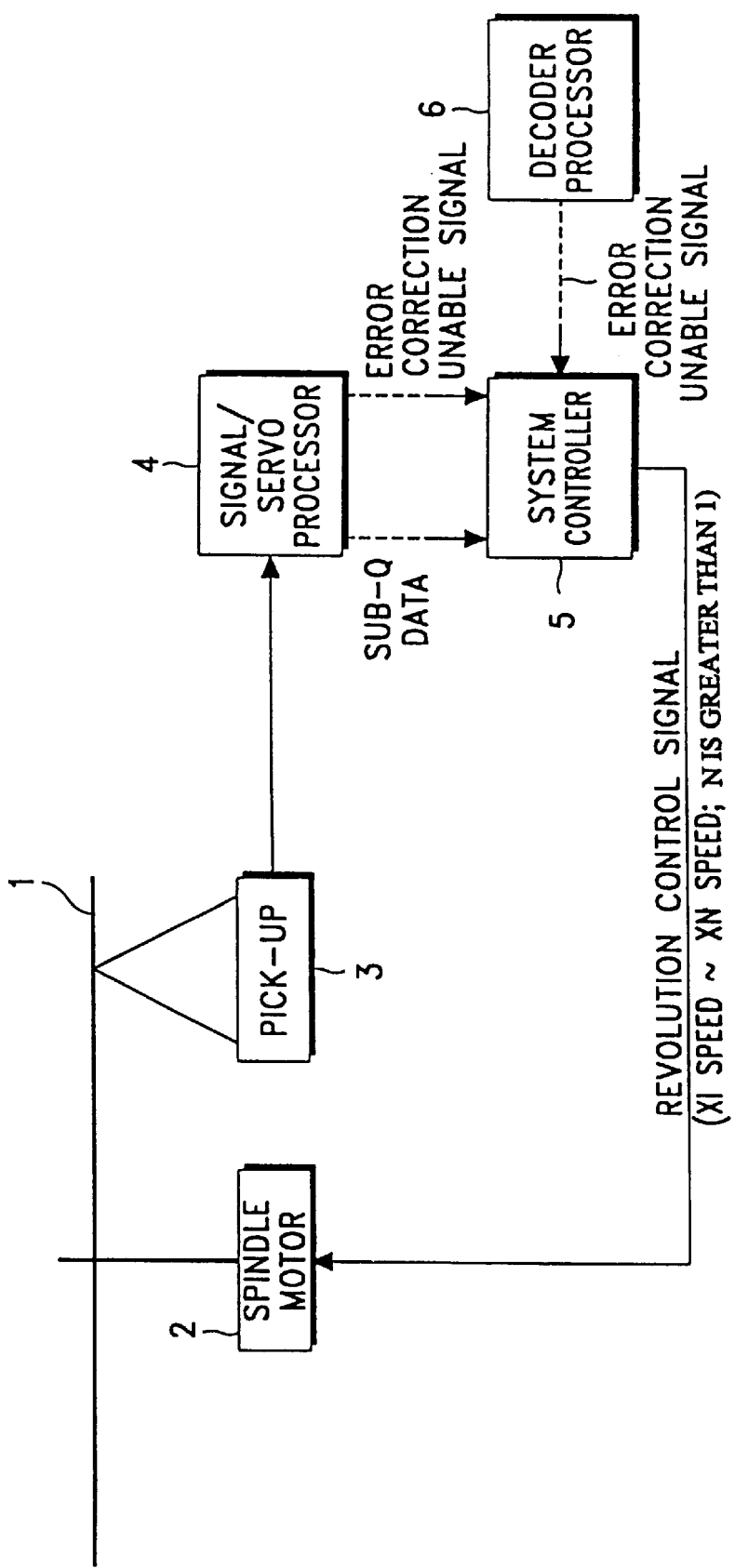
FIG. 1 is a block diagram of an optical disk drive according to an embodiment of the invention.

In the following description, numerous specific details such as particular components for the specific circuits are set forth to provide a more thorough understanding of the present invention. It will be apparent, however, to one skilled in the art of the present invention that the present invention may be practiced without these specific details. Furthermore, the detailed description of known functions and construction details unnecessarily obscuring the subject matter of the present invention is avoided in the following description.

Referring to FIG. 1, an optical disk 1 is rotated by a spindle motor 2, and a pick-up 3 accesses the target track of the optical disk 1 by moving radially to and from the beginning of the inner radius of the optical disk 1 (i.e., track jumping). Upon accessing the target track, the optical disk must rotate to the target location to read data therefrom. The pick-up 3 outputs a Read Frequency signal corresponding to the read data, to a signal/servo processor 4. The signal/servo processor 4 is formed as a unit composed of a digital signal processor (hereinafter referred to as "DSP") for processing the read frequency signal and a servo signal processor (hereinafter referred to as "SSP") for controlling a feed seek servo, and a track jump or a focus servo. The signal/servo processor 4 outputs a Sub-Q data and an error correction unable signal (hereinafter "error signal").

The Sub-Q data relates to the block position in the track of optical disk 1 where data to be read is located. Sub-Q data can be generally represented by using time units such as minutes, second and frame (hereinafter referred to as "MSF"). The error signal is output from signal servo processor 4 if the data is not read. If the error signal is not output, this indicates that error correction of the initially unreadable (i.e., defective) data has been successful and accordingly, the defective data has been read. The Sub-Q data and error signal are input to system controller 5. Additionally, a supplemental error signal is input to system controller 5 from a decode processor 6 which converts the Read Frequency signal into a signal used by a computer.

The system controller 5 controls the entire system operation and the defect study simultaneously. For example, it controls the revolution speed of spindle motor 2. The revolution speed of spindle motor 2 is generally set by a designation corresponding to the label "speed." For example, the minimum revolution speed is set by ×1 speed (equal to 500 rpm). The number of revolutions can be increased, and is respectively set up to XN where N>1, for example, ×16 speed (equal to 1800 rpm).

As an example, the defect study is performed in an optical disk drive as follows. Typically, a sequential reading operation is started at the beginning of the inner radius of optical disk 1, continuing radially outward until defective data is detected. At such time, system controller 5 reads the Sub-Q data corresponding to the defective data and at the same time, error correction is attempted by a retry operation. Error correction is continuously performed by reducing revolution speed of the recording medium until the error is corrected (i.e., the data can be read). For example, when the given revolution speed is set to ×8 speed, during error correction it is lowered to ×4 speed. If the defective data still cannot be read, it is further reduced to ×2 speed. The operation is repeated until error correction is complete, at which time the error signal from signal/servo processor 4 is no longer output. When error correction cannot be performed despite reducing revolution speed to ×1 speed (the minimum number of revolutions possible), then that defective data is unreadable.

After the position data of the initial defective data is determined, then the system controller 5 confirms whether or not error correction can be performed. Thereafter, subsequent defective data can be read and searched, thereby performing error correction according to the above manner. The defect study operation is performed repeatedly with respect to all defective data contained on optical disk 1.

As shown in FIG. 2, the results of the defect study operation are stored in a defect information table in RAM. In an illustrative embodiment, the RAM is installed in the system controller 5. However, the RAM can be contained anywhere within the disk drive or even in a computer controlling the disk drive. The defect information table includes the following: defective data numbers for identifying each position having defective data; the positions having defective data (MSF) for respectively matching to the above defective data numbers; and the revolution speeds of spindle motor 2 for each position having defective data. The revolution speeds, as stated earlier, includes both the speed at which the optical disk 1 is rotating when the error is detected and the speed at which the optical disk 1 is rotating when the error is corrected (the former designated "error" in the table of FIG. 2 and the latter designated "reproduction").

After performing the reading operation with defect study, the system controller 5 processes the defect data based on the generated defect information table. That is, upon accessing data having a given identification number in the defect information table, the revolution speed of the recording media is reduced by system controller 5 to the speed listed in the table which corresponds to that identification number to enable the reading of that defective data. After passing the corresponding defective data, the system controller 5 returns to the general reading operation according to the given revolution speed. Furthermore, in the defect information table of FIG. 2, it should be considered that error correction cannot be performed for defective data incapable of being read at ×1 speed, which is the minimum speed of revolution, such as in the case of the defective data corresponding to defective data number 7 in the table of FIG. 2.

As described above, according to the present invention, the reading of data can be controlled depending on the results of the defect study performed at the initial reading of such data (or during idle operation time). Therefore, the reading operation can be performed more smoothly by removing the causes for decreasing reading speed, for example, track jump during a retry operation. Furthermore, if every position having data is tested for the maximum number of revolutions at which data can be read at that position, the speed at which data can be read is significantly increased.

Therefore, it should be understood that the present invention is not limited to the particular embodiment disclosed herein, but rather it will be understood by those skilled in the art that various change and modification may be made without departing from the true scope of the present invention.

What is claimed is:

1. An apparatus for reading data from a disk type recording media, said apparatus having the capability of reducing the revolution speed at which the disk type recording media is rotated to read defective data, the apparatus comprising:

disk rotating means;

pick up means for reading the data from the disk and for outputting a signal corresponding to the read data;

signal processor means connected to said pick up means for processing the signal output from the pick up means and outputting a processed signal containing position data corresponding to positions having defective data; and controller means connected to said signal processor means and to said disk rotating means for recording each position of the disk having defective data and for iteratively transmitting at least one signal to the disk rotating means to reduce the revolution speed at which the disk is rotated and determining if the defective data can be read until an error correcting revolution speed is obtained, said controller means recording the error correcting revolution speed in relation to the recorded position of the defective data, and later controlling said disk rotating means to read the defective data at the recorded error correcting revolution speed.

2. The apparatus of claim 1, wherein said controller means records each position of the disk having defective data in a Random Access Memory.

3. The apparatus of claim 1, wherein the Random Access Memory is contained in said signal processing means.

4. A method for reading data from a disk-type recording media rotated at a given revolution speed, the revolution speed of the recording media being reduced to correct an error caused by defective data contained on the recording media, the method comprising the steps of:

identifying each position on the recording media having defective data;

performing an error correction test to determine the error correcting revolution speed for each identified position comprising the steps of:
reducing the revolution speed of the recording media;
determining if the defective data can be read;
continuously reducing the revolution speed of the recording media if the defective data cannot be read; and
determining that the defective data cannot be read if the revolution speed approaches a predetermined number of revolutions; and
controlling the subsequent reading of data in response to the error correcting revolution speed corresponding to each position having defective data.

5. The method of claim 4, wherein the step of performing an error correction test further comprises the step of recording the error correcting revolution speed in relation to the identified position having the defective data.

6. The method of claim 4, wherein the step of identifying each position having defective data on the recording media further comprises the steps of:
searching for each position having defective data on the recording media; and
recording each position having defective data thereon.

7. The method of claim 4, further comprising the steps of:
assigning a number for differentiating each identified position having defective data;
recording each number in relation to the corresponding recorded position; and
recording the error correcting revolution speed in relation to the recorded number and recorded position having defective data.

8. The method of claim 4, wherein the method is applied upon the initial reading of data.

9. The method of claim 4, wherein the method is applied during an idle state of the recording media.

10. A method for reading data from a disk-type recording media rotated at a given revolution speed, the revolution speed of the recording media being reduced to correct an error caused by defective data contained on the recording media, the method comprising the steps of:
identifying each position on the recording media having defective data;
performing an error correction test to determine the error correcting revolution speed for each identified position comprising the steps of:
reducing the revolution speed of the recording media;
determining if the defective data can be read;
recording the error correcting revolution speed in relation to the identified position having the defective data;
continuously reducing the revolution speed of the recording media if the defective data cannot be read; and
determining that the defective data cannot be read if the revolution speed approaches a predetermined number of revolution; and
controlling the reading of data in response to the error correcting revolution speed corresponding to each position having defective data.

11. The method of claim 10, wherein the step of identifying each position having defective data on the recording media further comprises the step of recording each such position.

12. The method of claim 11, further comprising the steps of:
assigning a number for differentiating each identified position having defective data; and
recording each number in relation to the corresponding recorded position and to the corresponding recorded error correcting revolution speed.

13. The method of claim 10, wherein the method is applied upon the initial reading of data.

14. The method of claim 10, wherein the method is applied during an idle state of the recording media.

* * * * *